(12) United States Patent
Yoshizawa et al.

(10) Patent No.: US 7,740,982 B2
(45) Date of Patent: Jun. 22, 2010

(54) ACTIVE MATERIAL, MANUFACTURING METHOD THEREOF, AND NON-AQUEOUS ELECTROLYTE SECONDARY BATTERY INCLUDING THE ACTIVE MATERIAL

(75) Inventors: Hiroshi Yoshizawa, Hirakata (JP); Shinji Nakanishi, Hirakata (JP); Hizuru Koshina, Palo Alto, CA (US)

(73) Assignee: Panasonic Corporation, Osaka (JP)

( * ) Notice: Subject to any disclaimer, the term of this patent is extended or adjusted under 35 U.S.C. 154(b) by 1346 days.

(21) Appl. No.: 11/152,087

(22) Filed: Jun. 15, 2005

(65) Prior Publication Data

US 2005/0281727 A1 Dec. 22, 2005

(30) Foreign Application Priority Data

Jun. 16, 2004 (JP) ............................. 2004-178518

(51) Int. Cl.
*H01M 4/58* (2010.01)
*C01B 21/20* (2006.01)
(52) U.S. Cl. .................................... 429/218.1; 423/385
(58) Field of Classification Search ................. 423/385; 429/231.95, 231.6, 223, 224, 218.1
See application file for complete search history.

(56) References Cited

U.S. PATENT DOCUMENTS 6,242,132 B1 * 6/2001 Neudecker et al. ....... 429/218.1

FOREIGN PATENT DOCUMENTS

| CN | 121857 | 6/1999 |
|---|---|---|
| JP | 06-275263 | 9/1994 |
| JP | 07-320784 | 12/1995 |
| JP | 09050810 A * | 2/1997 |
| JP | 11-102705 | 4/1999 |
| JP | 11-283624 | 10/1999 |
| JP | 2000-302547 | 10/2000 |
| JP | 2002-293546 A | 10/2002 |
| JP | 2002-356314 | 12/2002 |
| WO | WO 97/36334 | 10/1997 |

OTHER PUBLICATIONS

Katsumata et al. "Synthesis and characterization of novel rocksalt-type oxynitrides, LiTinOxNy (n=1,2,3,4 and 8)", Solid State Communications 132 (2004) 583-587. Available online Sep. 15, 2004.*
IPDL machine translation of JP 09-050810 A (1997).*

* cited by examiner

*Primary Examiner*—Gregg Cantelmo
(74) *Attorney, Agent, or Firm*—McDermott Will & Emery LLP (57) ABSTRACT

A resistivity of an active material is reduced to drastically decrease an amount of a conductive auxiliary agent to be added, in order to provide a non-aqueous electrolyte secondary battery with high capacity. A material represented by a composition formula: $Li_xMeO_yN_z$, wherein $0 \leq x \leq 2$, $0.1 < y < 2.2$, $0 < z < 1.4$, and Me is at least one selected from the group consisting of Ti, Co, Ni, Mn, Si, Ge, and Sn is used as an active material.

1 Claim, 3 Drawing Sheets

ACTIVE MATERIAL, MANUFACTURING METHOD THEREOF, AND NON-AQUEOUS ELECTROLYTE SECONDARY BATTERY INCLUDING THE ACTIVE MATERIAL

BACKGROUND OF THE INVENTION

The present invention relates to an active material used for a non-aqueous electrolyte secondary battery and a manufacturing method of the active material.

Lithium ion batteries used as primary power sources for mobile communication devices and portable electronic devices are characterized by high electromotive force and high energy density.

Examples of positive electrode active materials used for such lithium ion batteries include lithium cobalt oxide ($LiCoO_2$), lithium nickel oxide ($LiNiO_2$), manganese spinel ($LiMn_2O_4$), mixtures thereof, etc. These active materials have a voltage of not less than 4V relative to that of lithium. On the other hand, a carbon material is usually used in a negative electrode, which is combined with a positive electrode including the above-mentioned positive electrode active material to give a 4V level lithium ion battery.

Various technologies using a titanium oxide as a negative electrode active material have also been reported.

For example, Japanese Laid-Open Patent Publication No. Hei 06-275263 discloses a battery in which a titanium oxide is used for a negative electrode and a spinel-type manganese oxide or $LiCoO_2$ is used for a positive electrode, and Japanese Laid-Open Patent Publication No. Hei 07-320784 discloses a non-aqueous electrolyte lithium secondary battery comprising a negative electrode in which a spinel-type lithium-titanium oxide ($Li_{4/3}Ti_{5/3}O_4$) is used as an active material, a positive electrode in which $Li_2MnO_3$ or $LiMnO_2$ is used as an active material, and an electrolyte.

Also, Japanese Laid-Open Patent Publication No. Hei 11-283624 discloses a lithium secondary battery in which $Li_2Ti_3O_7$ is used for a negative electrode, and Japanese Laid-Open Patent Publication No. 2000-302547 discloses a manufacturing method of a negative electrode in which a preferable titanium oxide is used.

Unlike graphite used for a negative electrode, the titanium oxide useful for the active material disclosed in the above patent publication documents is low in electron conductivity. Also, even $LiCoO_2$ which comparatively has a better conductivity, the resistivity is about $1 \times 10^4$ Ωcm.

Therefore, materials with high conductivity such as acetylene black and graphite are generally used as a conductive auxiliary agent, when the titanium oxide such as the above is used for batteries.

On the other hand, Japanese Laid-Open Patent Publication No. Hei 11-102705 discloses a usage of a compound including oxygen and nitrogen, and at least one of silicon, germanium, and tin. Such active material is represented by a general formula: $M_xN_yO_z$, wherein, M is at least one element selected from the group consisting of Si, Ge, and Sn, and x, y, and z are respectively $1.4<x<2.1$, $1.4<y<2.1$, and $0.9<z<1.6$.

The object of the Japanese Laid-Open Patent Publication No. Hei 11-102705 is to provide an active material for a negative electrode with high capacity. In the active material of the Japanese Laid-Open Patent Publication No. Hei 11-102705, matrix-like quasi planes formed of chair-type six-membered rings comprising silicon and nitrogen spreads out, and in between these planes (between these layers), silicon—oxygen—silicon binds exist to crosslink, thereby creating one dimensional tunnel-like parts. The tunnel like parts become dope and de-dope site of the battery, and the negative electrode material to be obtained exerts a great capacity.

Therefore, in the negative electrode active material shown in Examples of Japanese Laid-Open Patent Publication No. Hei 11-102705, a crystal structure as a matrix comprising $Si_2N_2O$, $Ge_2N_2O$, or $Sn_2N_2O$ that are nitrogen oxide having N is important. However, Japanese Laid-Open Patent Publication No. Hei 11-102705 have no disclosure or implication on electron conductivities of the above negative electrode active material, and in its Examples, a carbon material is simply mixed as the conductive auxiliary agent.

As described above, when an oxide such as a titanium oxide is used in an active material for a negative electrode, highly conductive materials such as acetylene black and graphite also have to be used in combination as a conductive auxiliary agent, due to low electron conductivity of the oxide. However, since these conductive auxiliary agents are not power generating elements, battery capacity per unit volume is caused to decrease significantly.

Further, a titanium oxide $TiO_2$, for example, is an insulating material with a resistivity of about $1 \times 10^{14}$ Ωcm. When such material with poor electron conductivity is used as an active material, simply mixing in a conductive auxiliary agent is not sufficient. Some techniques such as increasing specific surface areas of active material particles, or coating surfaces of active material particles with a graphite material are necessary for the active material to work. However, granulation by grinding will lead to a decrease in charging amount, a further decrease in capacity, and an increase in costs for the manufacturing process.

BRIEF SUMMARY OF THE INVENTION

The present invention aims to solve the above problem, provide an active material with high conductivity despite using an oxide as a main body, and to provide a non-aqueous electrolyte secondary battery with high capacity.

The present invention proposes a usage of a nitrogen oxide with a resistivity of under $1 \times 10^4$ Ωcm as an active material.

It is preferable that the nitrogen oxide is amorphous, and is represented by a composition formula: $Li_xMeO_yN_z$, wherein, $0 \leq x \leq 2$, $0.1 < y < 2.2$, $0 < z < 1.4$, and Me is at least one selected from the group consisting of Ti, Co, Ni, Mn, Si, Ge, and Sn.

The active material of the present invention is produced by the steps comprising: heating an oxide with a resistivity of not less than $1 \times 10^4$ Ωcm under a reducing atmosphere, and reacting the heated oxide with ammonia gas, to obtain a nitrogen oxide with a resistivity of under $1 \times 10^4$ Ωcm, represented by a composition formula: $Li_xMeO_yN_z$, wherein, $0 \leq x \leq 2$, $0.1 < y < 2.2$, $0 < z < 1.4$, and Me is at least one selected from the group consisting of Ti, Co, Ni, Mn, Si, Ge, and Sn.

The gas forming the reducing atmosphere may be at least one selected from the group consisting of argon, nitrogen, carbon monoxide, and hydrogen. And the heating temperature may be 500° C. to 1500° C.

Also, it is preferable that the nitrogen oxide is heated with a temperature of not more than 400° C. under a reducing atmosphere after the reaction with the ammonia gas.

According to the present invention, an amount of the conductive auxiliary agent to be added can be significantly decreased and a non-aqueous electrolyte secondary battery can be provided, by decreasing the conductivity of the active material.

While the novel features of the invention are set forth particularly in the appended claims, the invention, both as to organization and content, will be better understood and

DETAILED DESCRIPTION OF THE INVENTION (1) Preparation of an Active Material According to the Present Invention An active material according to the present invention comprises a nitrogen oxide with a resistivity of below $1 \times 10^4$ Ωcm, preferably not more than $1 \times 10^3$ Ωcm, and can be prepared by the following steps: heating an oxide with a resistivity of not less than $1 \times 10^4$ Ωcm under a reducing temperature, and reacting the oxide after heating with ammonia gas, to obtain a nitrogen oxide represented by a composition formula: $Li_xMeO_yN_z$, wherein, $0 \leq x \leq 2$, $0.1 < y < 2.2$, $0 < z < 1.4$, and Me is at least one selected from the group consisting of Ti, Co, Ni, Mn, Si, Ge, and Sn.

Among nitrogen oxides, it is preferable that the above nitrogen oxide is amorphous. When the nitrogen oxide is amorphous, cycle life of a battery can be improved, and is effective.

In the present invention, a powdered oxide such as a metal oxide, a transition metal oxide, a metal oxide containing lithium, and a transition metal oxide containing lithium (for example, $TiO_2$, $LiNi_{1/3}Mn_{1/3}Co_{1/3}O_2$, $LiCoO_2$, $LiNi_{5/6}Co_{1/6}O_2$, $LiMn_2O_4$, $LiVO_2$, $MnO_2$, $V_2O_5$, SnO, $SiO_y$ (preferably, y is 1.0 to 1.5) and the like) is heated with a temperature of not less than 500° C. to not more than 1500° C. under a reducing atmosphere such as ammonia gas and hydrogen gas, to obtain a conductive material (the above nitrogen oxide).

Also, it is preferable that an amorphous oxide is used as a raw material, in order to obtain an amorphous nitrogen oxide.

When the above temperature is below 500° C., the reaction time becomes longer. On the other hand, when the above temperature is over 1500° C., the temperature becomes excessively high. Both of these cases will lead to an increase in costs. In view of the costs and an amount of nitrogen to be used, it is preferable that the above temperature is 500 to 1100° C.

Also, in order to securely and easily obtain the amorphous nitrogen oxide especially, it is preferable that the above temperature is 500 to 900° C.

However, when the conductive material obtained is sintered by the above heating, there may be a case when it is difficult to use the sintered product as it is for an active material of a secondary battery.

In such a case, the sintered product can be made readily available as an active material if mechanically ground with an existence of a solvent and the like and then dried, for example.

Also, a raw material oxide may be made a partially suboxide under a hydrogen gas atmosphere, and then reacted with the ammonia gas.

Further, it is preferable that the nitrogen oxide obtained by the above step is subjected to a subsequent step in which the nitrogen oxide is heated under a reducing atmosphere with a temperature of not more than 400° C. The reducing atmosphere may be a nitrogen gas. Also, the obtained nitrogen oxide can be heated with a temperature of not more than 400° C., with a co-existence of an organic reducing agent of alcohol such as methanol or butanol, or under ammonia gas atmosphere, to remove excessive oxygen and adsorbed substances such as nitrogen and ammonia derived from the ammonia gas on the particle surfaces, for example. Based on this, a resistivity of the powdered active material to be obtained will decrease. For the organic reducing agent, ketones, esters, amines, and the like may be used, other than the alcohols.

The decrease in resistivity is probably made possible by introducing a nitrogen atom from the surface of the oxide as a raw material into the oxide with the above method, to change an oxygen arrangement in the vicinity of the surface of the oxide, and to generate a carrier involved with the conductivity.

Regarding the composition, as the result of analyzing the ratio for Me, O, and N with variations of a kind of the oxide as a raw material and reaction conditions, it became clear that the above composition formula satisfies $0.1 < y < 2.2$, $0 < z < 1.4$. Also, as for Li, although it may depend on a kind or a composition of the raw material, from conventionally known $LiMeO_2$ and $Li_2MeO_2$, it is considered appropriate that the above formula satisfies $0 \leq x \leq 2$.

(2) Measurement of Resistivity

The resistivity in the present invention refers to the resistivity measured by the following method. The powders of a raw material oxide, or of the nitrogen oxide thus obtained are charged into a mold for conductivity measurement in a specified amount. Then, a pressure is given to the charged powder. The intensity of the pressure is increased gradually, and changes in resistivity of the powder relative to the increase in the pressure are measured. At this time, although the resistivity of the powder decreases with the increase in pressure, a degree of the decrease becomes low gradually, and approaches a constant value. The constant value is made the resistivity.

(3) Electrochemical Measurement

When a model measurement of electrochemical properties is to be conducted for an active material of the present invention, a cell for the measurement of the electrochemical properties is made, as in the following.

First, a mixture is obtained by mixing 80 parts by weight of an active material, 10 parts by weight of acetylene black as a conductive auxiliary agent, and 10 parts by weight of PVdF (polyvinylidene fluoride) as a binder. The obtained mixture is diluted with NMP (N-methyl-2-pyrrolidone), and then applied on a current collector made of aluminum foil. After drying in a vacuum for 30 minutes at 60° C., the current collector having the applied mixture is cut to a size of 15 mm×20 mm, and then further dried in a vacuum for 14 hours at 150° C. to obtain an electrode. The obtained electrode is to have a thickness of between 120 μm to 190 μm.

As for a counter electrode, the one that can be obtained by pressing a lithium metal sheet on a plate made of stainless steel to attach thereon is used, for example. As for a separator, a porous film made of polyethylene can be used, for example. As for an electrolyte, the one that can be obtained by dissolving $LiPF_6$ of 1.0M in a solvent in which EC (ethylene carbonate) and DMC (dimethyl carbonate) are mixed in a proportion of 3:7 is used, for example. Then, in a charge and discharge (hereinafter referred to as charge/discharge) test, charge/discharge is repeated under a current density of 0.17 mA/cm² and under a predetermined voltage range, for example.

(4) Other Members

As for the separator, a microporous membrane of polyolefin and a non-woven fabric of polyolefin may be used. Polyester also may be used. Generally, aluminum and an aluminum alloy foil are used for a current collector of a positive electrode, and a copper foil is used for a current collector of negative electrode. In the case of the present invention, the current collectors are selected depending on charge/discharge potential of each active material. For example, when an active material comprising a titanium oxide containing a nitrogen atom and the like according to the present invention is used for a negative electrode, since it has a higher potential than a lithium absorbing potential of aluminum, a thin film of aluminum or an aluminum alloy can be used for the current collector.

Figure 2:
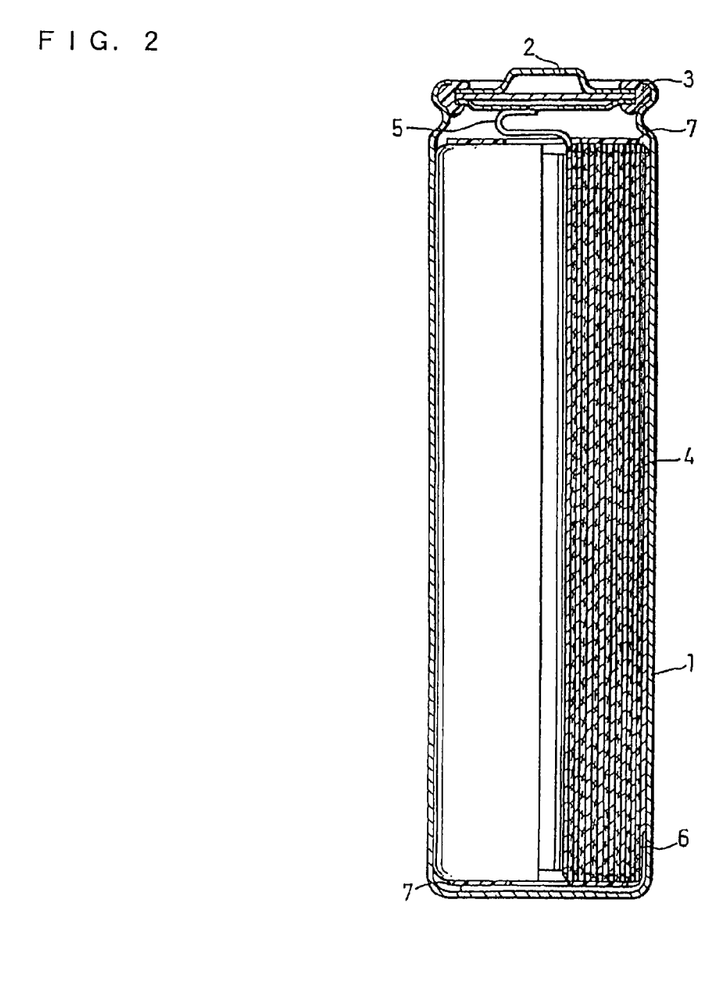
FIG. 2 shows a schematic vertical cross section of a cylindrical battery produced in Examples of the present invention.

A schematic vertical cross section of an example of a cylindrical battery obtained by using the active material of the present invention is shown in FIG. 2.

In FIG. 2, an electrode plate group 4 in which a positive electrode plate and a negative electrode plate are wound around several times interposing a separator is housed in a battery case 1. Then, a positive electrode lead 5 is drawn out from the positive electrode plate to connect with a sealing plate 2, and a negative electrode lead 6 is drawn out from the negative electrode plate to connect with a bottom part of the battery case 1. For the battery case and a lead plate, metals and alloys which have electron conductivity and chemical resistance to organic electrolytes may be used.

For example, metals such as iron, nickel, chromium, molybdenum, copper, aluminum, or alloys thereof may be used for the battery case and the lead plate. Especially, a stainless steel plate and a processed Al—Mn alloy plate are the most preferable for the battery case; aluminum is the most preferable for the positive electrode lead; and nickel is the most preferable for the negative electrode lead. Also, various engineering plastics, and a combination of an engineering plastic and a metal may be used for the battery case, in order to achieve a lighter weight.

Insulating rings 7 are provided respectively at an upper part and a bottom part of the electrode plate group 4. Then, an electrolyte is filled into the battery case, and the battery case is sealed with the sealing plate. At this time, a safety valve can be provided at the sealing plate. Other than the safety valve, already known various safety devices can be provided.

For example, as an over-current preventing device, a fuse, a bimetal, a PTC device, and the like are used. Also, as a countermeasure for an increase in internal pressure of the battery case, a method to provide slits to the battery case, a method to provide cracks to a gasket, a method to provide cracks to the sealing plate, or a method to provide a disconnection with the lead plate can be used. Also, a protective circuit in which measures for an overcharge and an overdischarge are incorporated may be provided to a charger, or the circuit may be connected independently.

Also, for a countermeasure for an overcharge, a method to break a current based on an increase in an internal pressure of a battery may be provided. At that time, a chemical compound which increases the internal pressure can be included in a material mixture or the electrolyte. As for the chemical compound that increases the internal pressure, carbonates such as $Li_2CO_3$, $LiHCO_3$, $Na_2CO_3$, $NaHCO_3$, $CaCO_3$, and $MgCO_3$, can be mentioned.

For welding a cap, the battery case, the sheets, and the lead plates, known methods (an electrical welding of direct current or alternating current, a laser welding, an ultrasonic welding, and the like) can be used. Also, for a sealing agent for sealing, conventionally known chemical compounds or mixtures such as an asphalt can be used.

Although a non-aqueous electrolyte secondary battery according to the present invention can be formed by combining these elements, for the other materials to be used for producing the non-aqueous electrolyte secondary battery of the present invention, already known material can be used. For example, as a binder used at the time of producing the positive and negative electrodes, polyvinylidene fluoride and styrene butadiene rubber may be used.

The present invention is explained in the following examples, but the present invention is not limited thereto.

EXPERIMENTAL EXAMPLE 1

Titanium dioxide $TiO_2$ has a resistivity of $1 \times 10^{14}$ Ωcm and is almost an insulator. However, when an electrode obtained by adding sufficient amounts of a conductive auxiliary agent and a binder to the titanium dioxide is used, a battery which can discharge with a discharge potential of about 1.7V relative to Li metal can be obtained. For example, when $LiCoO_2$ is used for a positive electrode, and $TiO_2$ is used for a negative electrode, a lithium ion battery with 2V class can be formed.

However, due to a low conductivity of $TiO_2$, particles of $TiO_2$ have to be made finer, and further, a significant amount of the conductive auxiliary agent will be necessary. These factors would lead to a battery with a low energy capacity and high cost. Also, when titanium dioxide is used for the positive electrode and Li metal is used for the negative electrode, a lithium battery with 1.7V can be formed. However, the above mentioned problems still remain. Thus, in this experimental example, an active material according to a method of the present invention was made from titanium dioxide $TiO_2$.

White titanium dioxide in powder was put into a quartz reaction tube, and heated to 800° C. under a nitrogen gas atmosphere. Then, ammonia gas was introduced into the reaction tube to react for 10 hours, to obtain a nitrogen oxide.

After the reaction, since the obtained nitrogen oxide was sintered, the nitrogen oxide was ground in water by using a ball mill, to obtain an active material 1 ($TiO_{1.7}N_{0.3}$) according to the present invention. A volume resistivity of the obtained active material was measured as described above and the results are shown in Table 1.

Also, methanol was added to the active material 1 produced in the above, and the active material was further reacted for 10 minutes under a nitrogen gas atmosphere at 300° C., to obtain an active material 2 of the present invention.

Thus, volume resistivities of the active materials 1 and 2 thus obtained according to the present invention are shown in Table 1. Further, for comparison, a volume resistivity of unprocessed $TiO_2$ (an active material 3) was measured also. The results are shown in Table 1.

TABLE 1

|  | Reaction Condition (high temperature reducing process) | Subsequent step (low temperature reducing process) | Resistivity Ω cm |
|---|---|---|---|
| Active Material 1 ($TiO_{1.7}N_{0.3}$) | $N_2$, 800° C. $NH_3$, 800° C. | Not Conducted | 9.0 |
| Active Material 2 ($TiO_{1.7}N_{0.3}$) | $N_2$, 800° C. $NH_3$, 800° C. | Methanol, 300° C., $N_2$ | 3.0 |
| Active Material 3 ($TiO_2$) | Not Conducted | Not Conducted | $1 \times 10^{14}$ |

As is clear from Table 1, a resistivity of an insulator $TiO_2$ was drastically decreased due to the introduction of nitrogen atom. Also, when the subsequent step of the reducing process under a low temperature was added, the resistivity further decreased.

Figure 1:
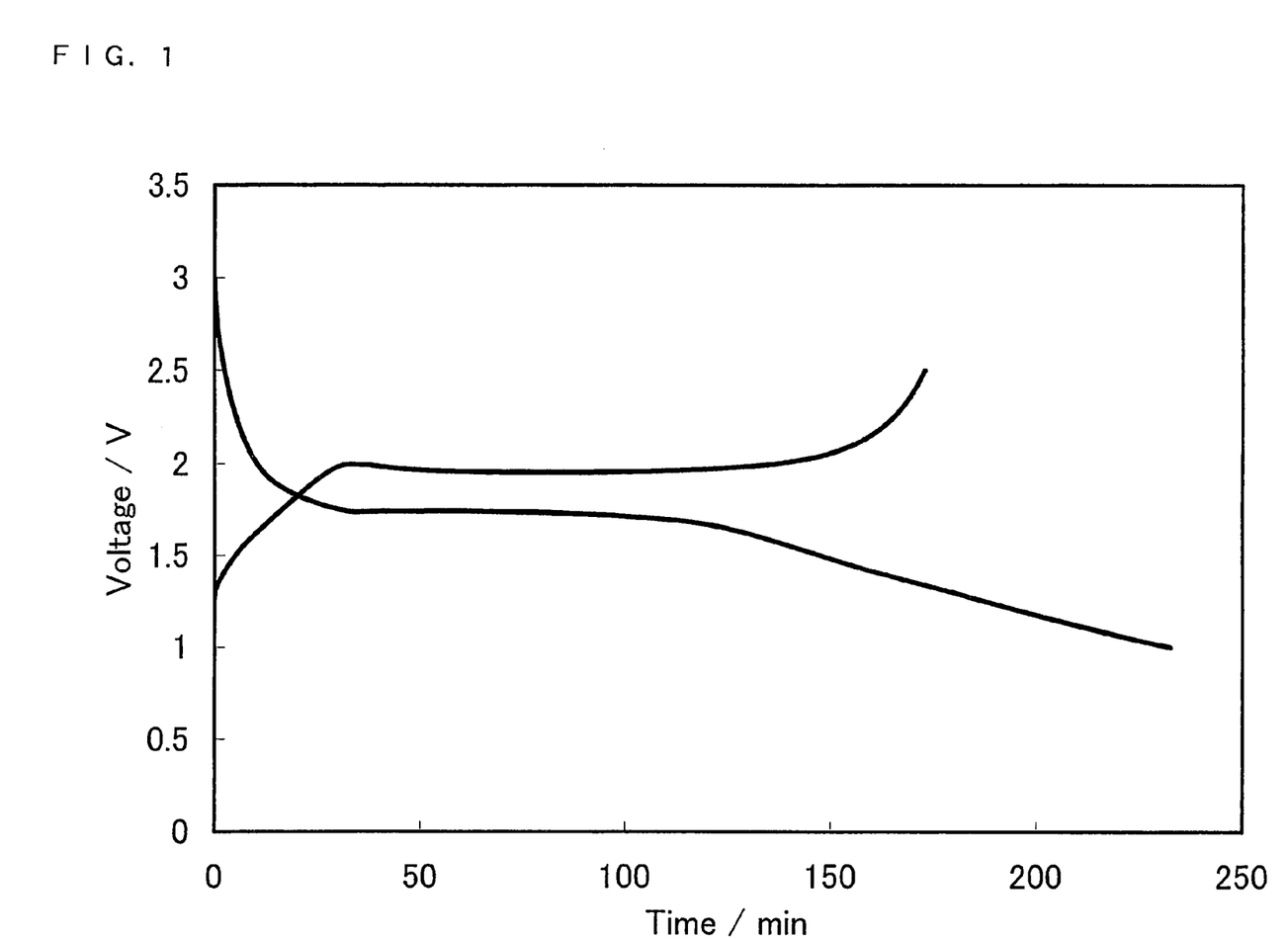
FIG. 1 shows charge and discharge curves of an active material $TiO_{2-x}N_x$ in accordance with the present invention.

The electrochemical property of the active material 1 of the present invention obtained in Example 1 is shown in FIG. 1. The measurement of the electrochemical property was conducted by the above described method.

That is, a mixture was obtained by mixing 80 parts by weight of the active material, 10 parts by weight of acetylene black as a conductive auxiliary agent, and 10 parts by weight of PVDF (polyvinylidene fluoride) as a binder. The obtained mixture was diluted with NMP (N-methyl-2-pyrrolidone), and then applied on a current collector made of aluminum foil. After drying in a vacuum for 30 minutes at 60° C., the current collector having the applied mixture was cut to a size of 15 mm×20 mm, and then further dried in a vacuum for 14 hours at 150° C., to obtain an electrode with a thickness of 120 μm.

Then, as for a counter electrode, a lithium metal was used. As for a separator, polyethylene porous film was used. And for an electrolyte, the one that can be obtained by dissolving $LiPF_6$ of 1.0M in a solvent in which EC (ethylene carbonate) and DMC (dimethyl carbonate) were mixed in a proportion of 3:7 was used. Then, charge/discharge was repeated under a current density of 0.17 mA/cm$^2$ and under a predetermined voltage range, to 1.0V in the case of discharging, and to 2.5V in the case of charging. The measurement was conducted from discharging, first. The results of the initial discharge and charge are shown in FIG. 1.

From FIG. 1, it is clear that this active material can charge/discharge at almost the same potential with the oxide before introducing the nitrogen atom. Also, as the active material 2 obtained in the above, almost the same results as shown in FIG. 1 were obtained.

EXPERIMENTAL EXAMPLE 2

White titanium dioxide $TiO_2$ in powder was put into a quartz reaction tube, and heated to 700° C. under a nitrogen gas atmosphere. Then, ammonia gas was flowed into the reaction tube with a flow rate of 300 ml/min while a nitrogen gas was flowed into the reaction tube with a flow rate of 50 ml/min, to react for 28 hours, to obtain a nitrogen oxide. After the reaction, since the obtained nitrogen oxide was sintered, the nitrogen oxide was ground in water by using a ball mill.

Further, the nitrogen oxide after the grinding was put into the quartz tube with methyl ethyl ketone, and heated under a nitrogen atmosphere at 300° C. for 20 minutes, and subjected to a quick cooling to obtain an active material 4 according to the present invention ($TiO_{1.0}N_{1.0}$). The volume resistivity of the active material thus obtained was measured as described above, and it was revealed that the volume resistivity was 1.0 Ωcm.

Further, white titanium dioxide $TiO_2$ in powder was put into a quartz reaction tube, and heated to 800° C. under a nitrogen gas atmosphere. Then, ammonia gas was flowed into the reaction tube with a flow rate of 300 ml/min while a nitrogen gas was flowed into the reaction tube with a flow rate of 50 ml/min, to react for 5 hours, to obtain a nitrogen oxide.

After the reaction, since the obtained nitrogen oxide was sintered, the nitrogen oxide was ground in water by using a ball mill, to obtain an active material 5 ($TiO_{1.89}N_{0.11}$) of the present invention. The volume resistivity of the active material thus obtained was measured as described above, and it was revealed that the volume resistivity was 10 Ωcm.

Upon conducting surface element analysis by using ESCA on the active materials 4 and 5 thus obtained, it was confirmed that the compositions were stratified, and showed gradual changes.

The surface layer was mainly composed of a titanium nitride. And from a surface layer to the inner part, it was composed of a titanium oxynitride, in which nitride content decreases while oxygen content increases.

Also, in the active materials 4 and 5 above, the particle which was formed of the titanium oxynitride for the surface and the inner part (A), and the particle in which almost no nitride was observed and oxygen content was decreased from the titanium dioxide (B) were confirmed. It is noted that the particles had various shapes including a spherical shape.

In the active materials 1, 2, 4, and 5 according to the present invention obtained in the above Experimental Examples, it was observed that some particles had either a structure of (A) or (B), but some particles had a combined structure of A and B. Thus, since $TiO_{1.7}N_{0.3}$ and $TiO_{1.89}N_{0.11}$ ("a"=0.3 or 1.0 in $TiO_{2-a}N_a$) were obtained as the preferred active materials, and the surface analysis results such as the above were obtained, $Li_xMeO_yN_z$ (x=0, 0.1<y<2, 0<z<1.4, and Me is Ti) could be specified as the preferred composition of the active material. The values of y and z were determined by concerning errors of the analyzed value. Also, as for the lowest limit of the degree of the nitration, since "a" of $TiO_{2-a}N_a$ was 0.11, it may be considered that a part of the oxygen is replaced with the nitrogen. However, because a precise analysis is relatively difficult, and because value 0.11 of "a" is small, it was specified as 1<y<2.

EXPERIMENTAL EXAMPLE 3

Based on the fact that an active material according to the present invention increases a conductivity and a reduction in an amount of a conductive auxiliary agent can be expected when a battery is formed by using such active material, the active material obtained in Experimental Example 1 was used to compare capacities based on decreases of the conductive auxiliary agent, to evaluate a reduction in an amount of the conductive auxiliary agent. The results are shown in Table 2.

As for the evaluations, the measurement method of the above electrochemical properties was conducted by varying amounts of acetylene black as the conductive auxiliary agent. As for discharging capacity, comparative values relative to the value (set as 100) of capacity when the active material 1 were used and 10 parts by weight of the conductive auxiliary agent was added, are shown.

TABLE 2

|  | Amount of Acetylene Black [%] | Discharge Capacity [%] |
| --- | --- | --- |
| Active Material 1 ($TiO_{1.7}N_{0.3}$) | 10 | 100 |
| Active Material 1 ($TiO_{1.7}N_{0.3}$) | 5 | 100 |
| Active Material 1 ($TiO_{1.7}N_{0.3}$) | 2 | 100 |
| Active Material 1 ($TiO_{1.7}N_{0.3}$) | 1 | 100 |
| Active Material 1 ($TiO_{1.7}N_{0.3}$) | 0.5 | 99 |
| Active Material 1 ($TiO_{1.7}N_{0.3}$) | 0.2 | 95 |
| Active Material 2 ($TiO_{1.7}N_{0.3}$) | 0.2 | 97 |
| Active Material 3 ($TiO_2$) | 10 | 70 |

TABLE 2-continued

| | Amount of Acetylene Black [%] | Discharge Capacity [%] |
|---|---|---|
| Active Material 3 ($TiO_2$) | 5 | 40 |
| Active Material 3 ($TiO_2$) | 1 | 12 |

From Table 2, it became clear that the active material according to the present invention is able to maintain the capacity despite a significant decrease in the amount of conductive auxiliary agent. As a result, capacity per volume can be increased based on a decreased amount of the conductive auxiliary agent when this active material is applied in a non-aqueous electrolyte secondary battery.

Additionally, although it is clear that the active material of the present invention can be used for a positive electrode, by combining with an active material such as $LiCoO_2$ which has a higher potential than the active material of the present invention, for example, the active material of the present invention can be used as an active material for a negative electrode. In such case, a battery of 2V class can be achieved.

EXPERIMENTAL EXAMPLE 4

In this experimental example, an active material of the present invention was formed by using an oxide of transition metal containing lithium as a raw material and introducing a nitrogen atom. A resistivity of an oxide of transition metal $LiNi_{1/3}Mn_{1/3}Co_{1/3}O_2$ is higher compared with $TiO_2$, but is about $1 \times 10^4$ Ωcm. However, when this oxide of transition metal is to be used as an active material, under the status quo, sufficient discharging properties as a practical battery can not be obtained unless a conductive auxiliary agent of about 3 wt % is added.

Thus, an active material 6 of the present invention ($LiNi_{1/3}Mn_{1/3}Co_{1/3}O_{1.9}N_{0.1}$) was obtained by introducing a nitrogen atom to $LiNi_{1/3}Mn_{1/3}Co_{1/3}O_2$ as a raw material in the same manner as in Experimental Example 1. As a result of a measurement of a resistivity of the active material thus obtained, it was revealed that the resistivity was $2 \times 10^2$ Ωcm. Also, although electrochemical property of this active material was evaluated in the same manner as the above, there was no obvious difference in charge/discharge behaviors before and after the introduction of the nitrogen atom, and worked as an active material of 4V class when a lithium metal was used as a counter electrode.

Although this active material can be used as a positive electrode by combining with a graphite or the like, it was also able to be used as a negative electrode. When the lithium metal was used for the counter electrode, a charging potential of 1V to 1.5V was shown. Therefore, a battery of about 2V was formed when $LiCoO_2$ was used for the positive electrode, and a battery of about 3V was formed when a higher potential $LiNi_{1/2}Mn_{3/2}O_4$ was combined.

Herein, in order to check a nitration rate, value x in $LiNi_{1/3}Mn_{1/3}Co_{1/3}O_{2-x}N_x$ was changed to the values shown in Table 3 by changing preparing conditions. As to the preparing conditions, the active materials were heated under a nitrogen atmosphere to a temperature of 800° C., and duration of the reaction by introducing ammonia gas was changed. For a subsequent step, methyl ethyl ketone was added, and reacted under a nitrogen atmosphere at a temperature of 300° C., by varying the reaction time.

TABLE 3

| | Reaction Condition $N_2$, $NH_3$, 800° C. | Subsequent Step Methyl Ethyl Ketone, $N_2$ | X Value |
|---|---|---|---|
| Active Material 7 | 15 hours | Not Conducted | 0.15 |
| Active Material 8 | 48 hours | 1 hour | 0.30 |
| Active Material 9 | 72 hours | 5 hours | 1.3 |

In this experimental example, the volume resistivity of all the active materials were $1 \times 10^2$ Ωcm.

Also, when the surface element analysis was conducted for the active materials 7 to 9 using ESCA in the same manner as the above, it was confirmed that the compositions were stratified and were gradually changing. A surface layer was mainly composed of titanium nitride. From the surface layer to the inner part were composed of titanium oxynitride, in which nitrogen content was gradually decreasing, while oxygen content was increasing. Additionally, the active material with the surface layer and inner part both composed of titanium oxynitride (A) and the active material with almost no nitrogen observed and oxygen content was decreased from titanium dioxide (B) were confirmed.

In the active materials 7 to 9 according to the present invention obtained in the above example, it was observed that some had a sole structure of either (A) or (B), and some had a structure of a combination of these (A) and (B). From the above results, it was specified that a preferable composition for the active material of the present invention was $Li_xMeO_yN_z$, wherein, $0 \leqq x \leqq 0$, $0.1 < y < 2.2$, and $0 < z < 1.4$.

EXPERIMENTAL EXAMPLE 5

An active material 10 ($SiO_xN_y$) and an active material 11 ($SnO_xN_y$) of the present invention were prepared in the same manner as in Example 1 by using SiO and SnO as a raw material, respectively.

When an X-ray diffraction was conducted for the obtained active materials, a pattern identified with $Si_2N_2O$ as disclosed in Japanese Laid-Open Patent Publication No. 11-102705 was not confirmed. This is probably because in the active material of the present invention, the electron conductivity is given by changing an oxygen arrangement, due to the introduction of a nitrogen atom to the surface of the active material, instead of to the whole of the active material as a matrix. The resistivities of the active material 10 ($SiO_xN_y$) and active material 11 ($SnO_xN_y$) were $1 \times 10^3$ Ωcm, and $1 \times 10^2$ Ωcm, respectively.

EXPERIMENTAL EXAMPLE 6

The effects of a reduction in a conductive auxiliary agents for the active material 6 ($LiNi_{1/3}Mn_{1/3}Co_{1/3}O_{1.9}N_{0.1}$), the active material 10 ($SiO_xN_y$), and the active material 11 ($SnO_xN_y$) of the present invention were considered in the same manner as in the above Experimental Example 3. The results are shown in Table 4.

The cases when raw materials $LiNi_{1/3}Mn_{1/3}Co_{1/3}O_2$, SiO, and SnO for an active material in the present invention were used were also evaluated in the same manner for comparison. As for the capacity, ratio against the value when a conductive auxiliary agent in an amount of 20 wt % was added to the each raw material (set as 100%) was shown.

TABLE 4

| Active Material | Amount of Acetylene Black [wt %] | Content [%] |
|---|---|---|
| Active Material 6 | 20 | 100 |
| ($LiNi_{1/3}Mn_{1/3}Co_{1/3}O_{1.9}N_{0.1}$) | 1 | 98 |
| $LiNi_{1/3}Mn_{1/3}Co_{1/3}O_2$ | 20 | 100 |
|  | 1 | 45 |
| Active Material 10 | 20 | 100 |
| ($SiO_xN_y$) | 1 | 92 |
| SiO | 20 | 100 |
|  | 1 | 13 |
| Active Material 11 | 20 | 100 |
| ($SiO_xN_y$) | 1 | 98 |
| SnO | 20 | 100 |
|  | 1 | 12 |

From Table 4, it became clear that the active material of the present invention can maintain the capacity even with a decrease in an amount of conductive auxiliary agent significantly. As a result, when this active material is used in non-aqueous electrolyte secondary battery, the capacity per volume can be increased due to a decrease in an amount of the conductive auxiliary agent.

EXPERIMENTAL EXAMPLE 7

In this experimental example, a cylindrical battery explained the above by using FIG. 2 was produced. A negative electrode plate was produced as in the following. To 100 parts by weight of powdered negative electrode material ($TiO_{1.7}N_{0.3}$) of the present invention, 1 part by weight of carbon powder as a conductive material, 3 parts by weight of polyvinylidene fluoride resin as a binder were mixed. The obtained mixture was dispersed in a dehydrate N-methyl pyrrolidinone to obtain a slurry, and applied on a current collector made of aluminum foil. The coating was dried and pressed, and the whole was cut into a predetermined size, to obtain a negative electrode.

A positive electrode plate was produced in the same manner as the above negative electrode except that the active material of the present invention was changed to $LiNi_{1/3}Mn_{1/3}Co_{1/3}O_{2-x}N_x$.

As for a separator, a non-woven fabric of polypropylene was used. And for an organic electrolyte, the organic electrolyte in which 1.0 mol/liter of $LiPF_6$ was dissolved in a solvent mixture of ethylene carbonate (EC) and propylene carbonate (PC) with a proportion of 1:1 was used. The produced cylindrical battery had a diameter of 14.1 mm, and a height of 50.0 mm.

The cylindrical battery thus produced was charged with a constant voltage of 3.0V, and discharged with a constant current of 100 mA till the voltage became 1V. The obtained discharge capacity at this time was 550 mAh. Similarly, in a battery for comparison formed by using $LiNi_{1/3}Mn_{1/3}Co_{1/3}O_2$ for a positive electrode active material and $TiO_2$ for a negative electrode active material, a discharge capacity showed a low value of 90 mAh.

EXPERIMENTAL EXAMPLE 8

Various oxides as raw materials shown in Table 5 were nitrogenated by the following method, and volume resistivities were measured in the same manner as above.

Additionally, as shown in Experimental Example 6, a capacity percentage when the acetylene black (AB) was decreased to 1 wt % was measured in the same manner. In Table 5, [Capacity after Nitriding (AB 1 wt %)/Capacity before Nitriding (AB 1 wt %)] is shown as a rate of capacity increase.

TABLE 5

| Oxide | After Nitriding | Volume Resistivity [$\Omega \cdot cm$] | Increase Rate of Capacity |
|---|---|---|---|
| $LiCoO_2$ | $LiCoO_{2-x}N_x$ | $1 \times 10^2$ | 2.2 |
| $LiNi_{5/6}Co_{1/6}O_2$ | $LiNi_{5/6}Co_{1/6}O_{2-x}N_x$ | $1 \times 10^2$ | 1.8 |
| $LiMn_2O_4$ | $LiMn_2O_{4-x}N_x$ | $3 \times 10^2$ | 2.5 |
| $LiVO_2$ | $LiVO_{2-x}N_x$ | $1 \times 10^2$ | 2.0 |
| $MnO_2$ | $MnO_{2-x}N_x$ | $2 \times 10^2$ | 2.3 |
| $V_2O_5$ | $V_2O_{5-x}N_x$ | $1 \times 10^2$ | 2.1 |

From Table 5, it became clear that by nitriding oxides containing lithium or oxides known as an active material for a battery, conductivity is drastically improved, and as a result, a capacity of a battery to be obtained will increase.

EXPERIMENTAL EXAMPLE 9

Figure 3:
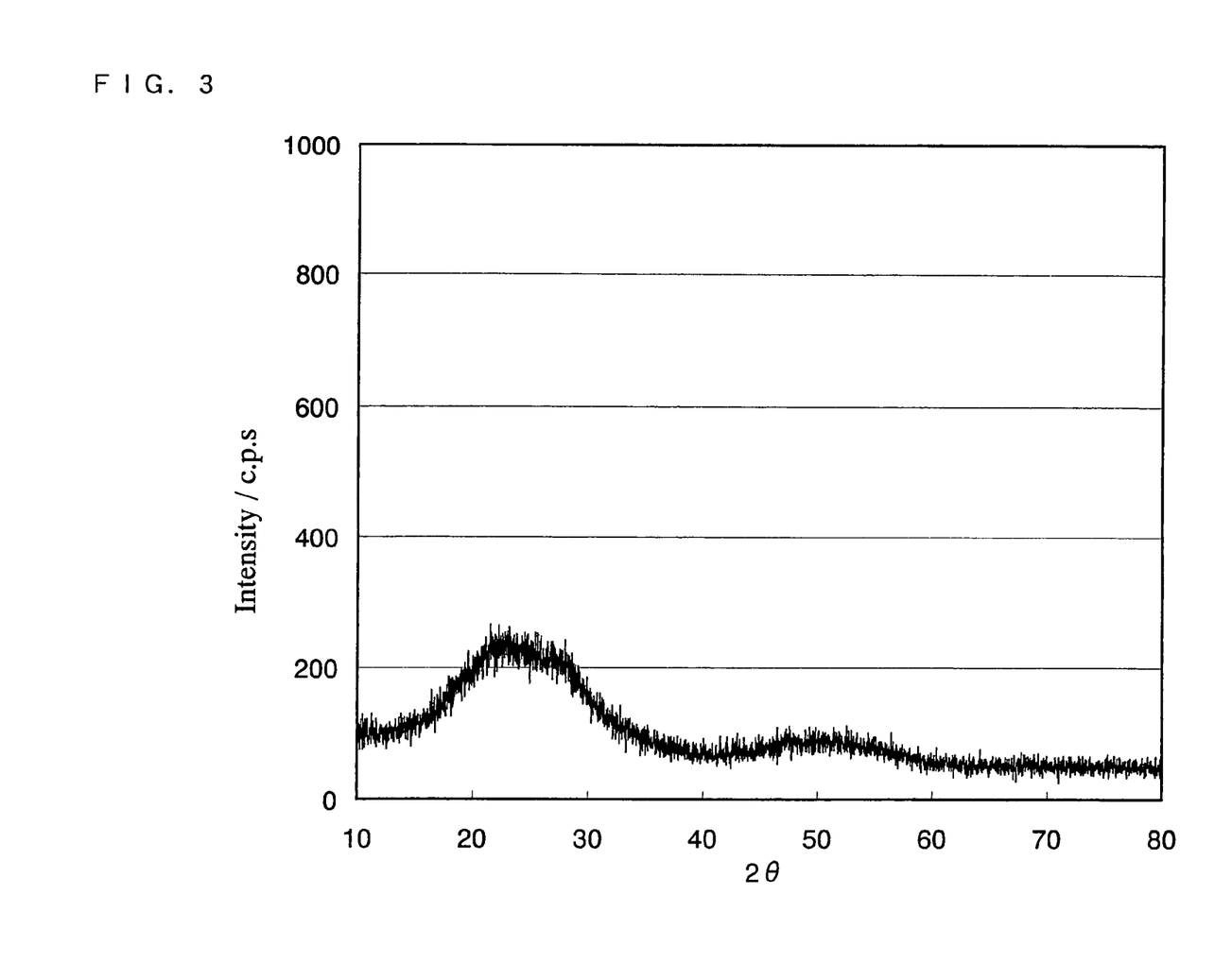
FIG. 3 shows an XRD pattern of an amorphous $SiO_{1.03}$.

Herein, an active material ($SiO_yN_z$) of the present invention was prepared by using amorphous $SiO_{1.03}$ as a raw material. First, an XRD pattern of amorphous $SiO_{1.03}$ is shown in FIG. 3. From FIG. 3, it is clear that $SiO_{1.03}$ is amorphous because a sharp peak attributed to a crystal was not observed and only a broad peak (diffraction) was observed.

Powder of amorphous $SiO_{1.03}$ (average particle diameter 8 μm) was put into a quartz reaction tube, and heated to 600° C. under a nitrogen gas atmosphere. Subsequently, ammonia gas was flowed into the reaction tube to react for 8 hours, to obtain a nitrogen oxide. The obtained nitrogen oxide was ground in water, to obtain an active material 12 (amorphous $SiO_xN_y$) of the present invention.

Upon measuring a volume resistivity of the obtained active material 12 of the present invention in the same manner as in Experimental Example 1 above, it was revealed that the volume resistivity was $1 \times 10^3$ Ωcm. Also, upon conducting an XRD analysis for the obtained active material 12, the same amorphous pattern with the amorphous $SiO_{1.03}$ as a raw material was observed.

Also, the powder of amorphous $SiO_{1.03}$ (average particle diameter 8 μm) same as the above was put into a quartz reaction tube, and heated to 1400° C. under a nitrogen gas atmosphere to obtain a nitrogen oxide. The obtained nitrogen oxide was ground in water, to obtain an active material 13 (amorphous $SiO_xN_y$) of the present invention.

Electrochemical measurements were conducted for the above active materials 12 and 13 in the same manner as Experimental Example 1. However, electrodes and the like were used by being put into an aluminum laminate bag and sealed with heat. For an electrode and a counter electrode, an aluminum lead and a nickel lead were attached respectively, to form terminals. Additionally, assuming a case when $SiO_yN_z$ is used as a negative electrode active material in an actual battery, charge/discharge was conducted in which a battery was charged till 0V, and discharged till 1.5V (voltage range 1 to 1.5V). Rate of discharge capacity after 20 cycles when a discharge capacity of the $3^{rd}$ cycle was set to 100 was shown in Table 6.

TABLE 6

| | Ratio of Capacity after 20 Cycles [%] |
|---|---|
| Active Material 12 | 99 |
| Active Material 13 | 72 |

From Table 6, it is clear that cycle life is excellent in the case when the amorphous active material 12 was used. Although crystalline substances existed only in proximity of the surface of the active material, it can be considered that by breaking the crystalline parts by charge/discharge, decline in cycle life was induced.

EXPERIMENTAL EXAMPLE 10

It is considered that crystalline substances which are regarded to give adverse effects to electrochemical properties are generated when a baking temperature is high. In order to clarify such temperature, the temperatures were changed by 100° C. from 500° C. to 1400° C. in the same method as in the above Experimental Example 9.

It was observed whether crystalline substances were observed in an XRD analysis, while the same electrochemical measurement as in Experimental Example 9 above was conducted. The results are shown in Table 7.

TABLE 7

| Temperature (° C.) | XRD Analysis | Ratio of Capacity after 20 Cycles [%] |
|---|---|---|
| 500 | Amorphous | 97 |
| 600 | Amorphous | 99 |
| 700 | Amorphous | 98 |
| 800 | Amorphous | 97 |
| 900 | Amorphous | 95 |
| 1000 | With Crystalline Peak | 86 |
| 1100 | With Crystalline Peak | 82 |
| 1200 | Crystalline | 75 |
| 1300 | Crystalline | 73 |
| 1400 | Crystalline | 72 |

From Table 7, it became clear that the crystallization was observed from the temperature of 1000° C., and that cycle life declined accordingly. Therefore, a preferable temperature is not more than 1000° C., and for shortening a time for nitriding, it is preferable that a temperature is 500 to 1000° C.

A battery with higher electromotive force and higher energy density can be obtained when the active material of the present invention is used. And such battery is suitable for a main power source for mobile communication devices and portable electronic devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery having a positive electrode and/or a negative electrode including:
   an active material,
   wherein said active material comprises a nitrogen oxide with a resistivity of below $1 \times 10^4$ $\Omega$cm, said nitrogen oxide is amorphous, and
   said active material is represented by a composition formula: $Li_xMeO_yN_z$, wherein $0 \leq x \leq 2$, $0.1 < y < 2.2$, $0 < z < 1.4$, and Me is at least one selected from the group consisting of Ti, Co, Ni, Mn Si, and Ge.

* * * * *